United States Patent [19]

Matsen et al.

[11] Patent Number: 5,645,744

[45] Date of Patent: Jul. 8, 1997

[54] RETORT FOR ACHIEVING THERMAL UNIFORMITY IN INDUCTION PROCESSING OF ORGANIC MATRIX COMPOSITES OR METALS

[75] Inventors: Marc R. Matsen, Seattle; Karl A. Hansen, deceased, late of Seattle; John J. deJong, executor, Bellevue, all of Wash.

[73] Assignee: The Boeing Company, Seattle, Wash.

[21] Appl. No.: 469,984

[22] Filed: Jun. 6, 1995

Related U.S. Application Data

[63] Continuation-in-part of Ser. No. 341,779, Nov. 18, 1994, which is a continuation-in-part of Ser. No. 169,655, Dec. 16, 1993, Pat. No. 5,530,227, which is a continuation-in-part of Ser. No. 777,739, Oct. 15, 1991, Pat. No. 5,410,132, said Ser. No. 341,779, is a continuation-in-part of Ser. No. 92,050, Jul. 15, 1993, Pat. No. 5,410,133, which is a division of Ser. No. 681,004, Apr. 5, 1991, Pat. No. 5,229,562, which is a continuation-in-part of Ser. No. 151,433, Nov. 12, 1993, Pat. No. 5,420,400.

[51] Int. Cl.$^6$ ............................................. H05B 6/10
[52] U.S. Cl. ........................... 219/634; 219/618; 219/633; 219/645; 219/647
[58] Field of Search ........................... 219/603, 604, 219/615, 618, 622, 633, 634, 635, 645, 646, 647

[56] References Cited

U.S. PATENT DOCUMENTS

| | | |
|---|---|---|
| 2,241,312 | 5/1941 | Luty . |
| 2,273,423 | 2/1942 | Somes . |
| 2,372,920 | 4/1945 | Blessing . |
| 2,378,801 | 6/1945 | Sidell et al. . |
| 2,379,829 | 3/1956 | Pedlow et al. . |
| 2,423,922 | 7/1947 | Arndt, Jr. . |
| 2,589,777 | 3/1952 | Collins . |
| 2,761,941 | 9/1956 | Ardichvili . |
| 2,841,678 | 7/1958 | Thorson . |

(List continued on next page.)

FOREIGN PATENT DOCUMENTS

| | | |
|---|---|---|
| 0461979 | 4/1984 | European Pat. Off. . |
| 54-25542 | 2/1979 | Japan . |
| 1418327 | 12/1975 | United Kingdom . |

OTHER PUBLICATIONS

J. Giachino, "Welding Skills and Practices," Am. Tech. Soc., Chicago, IL (1960, 1965, 1967, 1971, 1976) pp. 393–401.

Jones, "Mechanics of Composite Materials," McGraw–Hill (1975) pp. 4–5.

Smith, et al., "Developments in Titanium Metal Matrix Composites," Journal of Metals, Mar., 1984, pp. 19–26.

Quarterly Government Report for Sep., 1992 through Nov.

Border, et al., "Introduction Heated Joining of Thermoplastic Composites Without Metal Susceptors," 34th International SAMPE Symposium, May 8–11, 1989, pp. 2569–2578.

Sumida, et al., "Pan Based High Modulus Graphitized Carbon Fiber Torayca M60J," 34th International SAMPE Symposium, May 8–11, 1989, pp. 2579–2589.

Primary Examiner—Tu B. Hoang
Attorney, Agent, or Firm—John C. Hammar

[57] ABSTRACT

For forming or consolidating organic matrix composites, for example, an organic matrix composite panel is sealed in a "retort" between sheets of a susceptor material that is susceptible to induction heating. The susceptor sheets are heated inductively. The sheets in turn conduct heat to the organic matrix composite panel. When heated to the desired temperature, the composite panel is consolidated and/or formed. In the present invention, the susceptor sheets are selected so that their magnetic permeability decreases to unity at approximately the desired operating temperature thereby limiting heating to this "Curie temperature" and providing substantial uniformity of temperature in the panel. Of course, the concept applies to other induction heating operations for metals including SPF, brazing, annealing, heat treating, bonding, hot pressing, and the like.

1 Claim, 11 Drawing Sheets

U.S. PATENT DOCUMENTS

| | | |
|---|---|---|
| 2,898,435 | 8/1959 | Crafts . |
| 2,984,732 | 5/1961 | Herbert . |
| 3,037,105 | 5/1962 | Kohler . |
| 3,061,503 | 10/1962 | Gould et al. . |
| 3,101,403 | 8/1963 | Lewis et al. . |
| 3,110,961 | 11/1963 | Melill et al. . |
| 3,124,672 | 3/1964 | Sommer et al. . |
| 3,127,674 | 4/1964 | Kohler . |
| 3,129,459 | 4/1964 | Kullgren et al. . |
| 3,183,460 | 5/1965 | Bennon . |
| 3,288,979 | 11/1966 | Mills et al. . |
| 3,340,101 | 9/1967 | Fields, Jr. et al. . |
| 3,365,184 | 1/1968 | Willens . |
| 3,395,261 | 7/1968 | Leatherman et al. . |
| 3,395,993 | 8/1968 | Bristow . |
| 3,427,421 | 2/1969 | Matheson et al. . |
| 3,431,379 | 3/1969 | Yrene . |
| 3,444,275 | 5/1969 | Willett . |
| 3,450,856 | 6/1969 | Buck et al. . |
| 3,466,726 | 9/1969 | Savolainen . |
| 3,492,453 | 1/1970 | Hurst . |
| 3,507,735 | 4/1970 | Chisholm . |
| 3,529,458 | 9/1970 | Butler et al. . |
| 3,547,751 | 12/1970 | Morgan . |
| 3,549,847 | 12/1970 | Clark et al. . |
| 3,574,031 | 4/1971 | Heller, Jr. et al. . |
| 3,595,060 | 7/1971 | Hundy . |
| 3,605,477 | 9/1971 | Carlson . |
| 3,615,277 | 10/1971 | Kreider et al. . |
| 3,639,974 | 2/1972 | Finnegan . |
| 3,661,491 | 5/1972 | Troyer . |
| 3,705,284 | 12/1972 | Binard . |
| 3,754,109 | 8/1973 | Moulin et al. . |
| 3,845,268 | 10/1974 | Sindt . |
| 3,864,186 | 2/1975 | Balla . |
| 3,868,924 | 3/1975 | Reuschel et al. . |
| 3,890,819 | 6/1975 | DeLuca . |
| 3,895,436 | 7/1975 | Summers et al. . |
| 3,900,150 | 8/1975 | Delgrosso et al. . |
| 3,919,764 | 11/1975 | Berghezan . |
| 3,920,175 | 11/1975 | Hamilton et al. . |
| 3,924,793 | 12/1975 | Summers et al. . |
| 3,927,817 | 12/1975 | Hamilton et al. . |
| 3,934,441 | 1/1976 | Hamilton et al. . |
| 3,941,643 | 3/1976 | Balla . |
| 3,946,349 | 3/1976 | Heldeman, III . |
| 3,974,673 | 8/1976 | Fosness et al. . |
| 3,981,427 | 9/1976 | Brookes . |
| 3,996,019 | 12/1976 | Cogan . |
| 3,996,402 | 12/1976 | Sindt . |
| 4,005,302 | 1/1977 | Graf et al. . |
| 4,029,837 | 6/1977 | Leatherman . |
| 4,029,838 | 6/1977 | Chamis et al. . |
| 4,029,926 | 6/1977 | Austin . |
| 4,039,794 | 8/1977 | Kasper . |
| 4,060,364 | 11/1977 | Gras . |
| 4,091,254 | 5/1978 | Struve . |
| 4,111,024 | 9/1978 | Dahlman et al. . |
| 4,117,970 | 10/1978 | Hamilton et al. . |
| 4,120,712 | 10/1978 | Sindt . |
| 4,141,484 | 2/1979 | Hamilton et al. . |
| 4,145,903 | 3/1979 | Leach et al. . |
| 4,150,927 | 4/1979 | Steingroever . |
| 4,180,717 | 12/1979 | Lenk et al. . |
| 4,188,811 | 2/1980 | Brimm . |
| 4,210,477 | 7/1980 | Gillespie et al. . |
| 4,217,397 | 8/1980 | Hayase et al. . |
| 4,233,829 | 11/1980 | Hamilton et al. . |
| 4,233,831 | 11/1980 | Hamilton et al. . |
| 4,263,087 | 4/1981 | Tanabe et al. . |
| 4,263,336 | 4/1981 | Thompson et al. . |
| 4,263,375 | 4/1981 | Elrod . |
| 4,269,053 | 5/1981 | Agrawal et al. . |
| 4,288,673 | 9/1981 | Ishibashi . |
| 4,292,375 | 9/1981 | Ko . |
| 4,296,295 | 10/1981 | Kiuchi . |
| 4,304,821 | 12/1981 | Hayase et al. . |
| 4,304,975 | 12/1981 | Lenk et al. . |
| 4,305,449 | 12/1981 | Loszewski et al. . |
| 4,306,436 | 12/1981 | Schulz et al. . |
| 4,307,276 | 12/1981 | Kurata et al. . |
| 4,313,777 | 2/1982 | Buckley et al. . |
| 4,331,284 | 5/1982 | Schulz et al. . |
| 4,340,650 | 7/1982 | Pattanaik et al. . |
| 4,343,982 | 8/1982 | Schwartz et al. . |
| 4,351,470 | 9/1982 | Swadling et al. . |
| 4,352,280 | 10/1982 | Ghosh . |
| 4,354,369 | 10/1982 | Hamilton . |
| 4,355,222 | 10/1982 | Geithman et al. . |
| 4,361,262 | 11/1982 | Israeli . |
| 4,382,113 | 5/1983 | Schwartz et al. . |
| 4,393,987 | 7/1983 | Anderson et al. . |
| 4,398,659 | 8/1983 | Richter . |
| 4,416,713 | 11/1983 | Brooks . |
| 4,421,588 | 12/1983 | Davies . |
| 4,426,032 | 1/1984 | Leodolter . |
| 4,426,033 | 1/1984 | Mizuhara . |
| 4,445,951 | 5/1984 | Lind et al. . |
| 4,447,690 | 5/1984 | Grever . |
| 4,454,402 | 6/1984 | Sander et al. . |
| 4,468,549 | 8/1984 | Amosky . |
| 4,474,044 | 10/1984 | Leistner et al. . |
| 4,489,123 | 12/1984 | Schijve et al. . |
| 4,499,156 | 2/1985 | Smith et al. . |
| 4,521,659 | 6/1985 | Buckley et al. . |
| 4,524,037 | 6/1985 | Marc . |
| 4,530,197 | 7/1985 | Rainville . |
| 4,542,272 | 9/1985 | Hubbard . |
| 4,544,339 | 10/1985 | Itoh . |
| 4,555,373 | 11/1985 | Bloemkolk et al. . |
| 4,563,145 | 1/1986 | de Meij . |
| 4,584,860 | 4/1986 | Leonard . |
| 4,602,731 | 7/1986 | Dockus . |
| 4,603,089 | 7/1986 | Bampton . |
| 4,603,808 | 8/1986 | Stacher . |
| 4,610,934 | 9/1986 | Boecker et al. . |
| 4,621,761 | 11/1986 | Hammond et al. . |
| 4,622,445 | 11/1986 | Matsen . |
| 4,630,767 | 12/1986 | Mizuhara . |
| 4,635,461 | 1/1987 | Raymond . |
| 4,649,249 | 3/1987 | Odor . |
| 4,653,396 | 3/1987 | Wennerberg . |
| 4,657,717 | 4/1987 | Cattanach et al. . |
| 4,671,470 | 6/1987 | Jonas . |
| 4,673,450 | 6/1987 | Burke . |
| 4,698,271 | 10/1987 | Moorhead . |
| 4,699,849 | 10/1987 | Das . |
| 4,706,361 | 11/1987 | Meyer et al. . |
| 4,713,953 | 12/1987 | Yavari . |
| 4,716,072 | 12/1987 | Kim . |
| 4,745,245 | 5/1988 | Kitaide et al. . |
| 4,754,114 | 6/1988 | Sommer et al. . |
| 4,768,433 | 9/1988 | Boissevain . |
| 4,791,260 | 12/1988 | Waldman . |
| 4,794,217 | 12/1988 | Quan et al. . |
| 4,797,155 | 1/1989 | Das . |
| 4,812,052 | 3/1989 | Adam et al. . |
| 4,822,972 | 4/1989 | Sugioka et al. . |
| 4,824,617 | 4/1989 | Takeuchi et al. . |
| 4,855,011 | 8/1989 | Legge et al. . |
| 4,882,823 | 11/1989 | Weisert et al. . |
| 4,888,973 | 12/1989 | Comley . |

| | | | | | |
|---|---|---|---|---|---|
| 4,889,276 | 12/1989 | Cadwell et al. . | 5,079,817 | 1/1992 | Anstotz et al. . |
| 4,897,518 | 1/1990 | Mucha et al. . | 5,093,545 | 3/1992 | McGaffigan . |
| 4,901,552 | 2/1990 | Ginty et al. . | 5,101,086 | 3/1992 | Dion et al. . |
| 4,904,972 | 2/1990 | Mori et al. . | 5,115,963 | 5/1992 | Yasui . |
| 4,906,172 | 3/1990 | Stewart . | 5,118,026 | 6/1992 | Stacher . |
| 4,913,910 | 4/1990 | McCarville et al. . | 5,139,407 | 8/1992 | Kim et al. . |
| 4,919,759 | 4/1990 | Ilmarinen et al. . | 5,141,146 | 8/1992 | Yasui . |
| 4,934,581 | 6/1990 | Ibe et al. . | 5,199,791 | 4/1993 | Kasanami et al. . |
| 4,947,464 | 8/1990 | Mori et al. . | 5,229,562 | 7/1993 | Burnett et al. .......................... 219/634 |
| 4,951,491 | 8/1990 | Lorenz . | 5,240,542 | 8/1993 | Miller et al. . |
| 4,955,803 | 9/1990 | Miller et al. . | 5,248,864 | 9/1993 | Kodokian . |
| 4,978,825 | 12/1990 | Schmidt et al. . | 5,250,776 | 10/1993 | Pfaffmann . |
| 4,984,348 | 1/1991 | Cadwell . | 5,283,409 | 2/1994 | Brendel et al. . |
| 4,988,037 | 1/1991 | Cadwell . | 5,313,034 | 5/1994 | Grimm et al. . |
| 5,001,319 | 3/1991 | Holmstrom . | 5,313,037 | 5/1994 | Hansen et al. . |
| 5,024,369 | 6/1991 | Froes et al. . | 5,338,497 | 8/1994 | Murray et al. . |
| 5,032,327 | 7/1991 | Becheret . | 5,410,132 | 4/1995 | Gregg et al. .......................... 219/604 |
| 5,047,605 | 9/1991 | Ogden . | 5,410,133 | 4/1995 | Matsen et al. .......................... 219/645 |
| 5,064,978 | 11/1991 | Scholz . | 5,420,400 | 5/1995 | Matsen .......................... 219/615 |
| 5,074,019 | 12/1991 | Link . | 5,530,227 | 6/1996 | Matsen et al. .......................... 219/633 | y = SOME DEPTH FROM THE SURFACE OF THE PART
$\alpha$ = INVERSE OF THE SKIN DEPTH
Ho = MAGNETIC FIELD INTENSITY AT THE PART SURFACE
Hy = MAGNETIC FIELD INTENSITY AT THE DEPTH y

| MAXIMUM TEMPERATURE DIFFERENCE BELOW CURIE TEMP. | | | | |
|---|---|---|---|---|
| TIME | TC NO. 8 | TC NO. 7 | TC NO. 2 | TC NO. 4 |
| 501 SECS | 1155°F | 1209°F | 1414°F | 1361°F |
| 503 SECS | 1157°F | 1211°F | 1415°F | 1365°F |
| 505 SECS | 1159°F | 1213°F | 1416°F | 1369°F |
| 507 SECS | 1161°F | 1214°F | 1417°F | 1372°F |
| AT MAXIMUM RANGE OF CURIE TEMPERATURE | | | | |
| 700 SECS | 1451°F | 1436°F | 1447°F | 1461°F |
| 702 SECS | 1452°F | 1439°F | 1447°F | 1464°F |
| 704 SECS | 1456°F | 1442°F | 1452°F | 1468°F |
| 706 SECS | 1458°F | 1445°F | 1449°F | 1470°F |

FIG. 7

FIG. 10  Co-Fe  Cobalt-Iron

RETORT FOR ACHIEVING THERMAL UNIFORMITY IN INDUCTION PROCESSING OF ORGANIC MATRIX COMPOSITES OR METALS

REFERENCE TO RELATED APPLICATIONS

The present application is a continuation-in-part application based upon U.S. application Ser. No. 08/341,779, filed Nov. 18, 1994; which was a continuation-in-part application based upon U.S. patent application Ser. No. 08/169,655, filed Dec. 16, 1993 now U.S. Pat. No. 5,530,227; which was a continuation-in-part application of U.S. patent application Ser. No. 07/777,739, filed Oct. 15, 1991, now U.S. Pat. No. 5,410,132. U.S. patent application Ser. No. 08/341,779 also was a continuation-in-part application based upon U.S. patent application Ser. No. 08/092,050, filed Jul. 15, 1993, now U.S. Pat. No. 5,410,133; which was a divisional of U.S. patent application Ser. No. 07/681,004, filed Apr. 5, 1991, now U.S. Pat. No. 5,229,562; and finally, was a continuation-in-part application based upon U.S. patent application Ser. No. 08/151,433, filed Nov. 12, 1993, now U.S. Pat. No. 5,420,400. We incorporate these applications and patents by reference.

TECHNICAL FIELD

The present invention relates to a susceptor and its method of use for induction heating that produces better control of and more uniform temperature in the workpiece by capitalizing upon the Curie temperature of the susceptor sheets that surround the workpiece. The process improves consolidation or forming of organic matrix composites or induction processing of metals (especially brazing, superplastic forming (SPF), or combined cycles for brazing/SPF or SPF/annealing.)

BACKGROUND ART

Fiber-reinforced organic resin matrix composites have a high strength-to-weight ratio or a high stiffness-to-weight ratio and desirable fatigue characteristics that make them increasingly popular as a replacement for metal in aerospace applications where weight, strength, or fatigue is critical. Organic resin composites, be they thermoplastics or thermosets, are expensive today. There is a need for improved manufacturing processes to reduce touch labor and their forming time.

Prepregs combine continuous, woven, or chopped reinforcing fibers with an uncured, matrix resin, and usually comprise fiber sheets with a thin film of the matrix. Sheets of prepreg generally are placed (laid-up) by hand or with fiber placement machines directly upon a tool or die having a forming surface contoured to the desired shape of the completed part or are laid-up in a flat sheet which is then draped and formed over the tool or die to the contour of the tool. Then the resin in the prepreg lay up is consolidated (i.e. pressed to remove any air, gas, or vapor) and cured (i.e., chemically converted to its final form usually through chain-extension) in a vacuum bag process in an autoclave (i.e., a pressure oven) to complete the part.

The tools or dies for metal or composite processing typically are formed to close dimensional tolerances. They are massive, must be heated along with the workpiece, and must be cooled prior to removing the completed part. The delay caused to heat and to cool the mass of the tools adds substantially to the overall time necessary to fabricate each part. These delays are especially significant when the manufacturing run is low rate where the dies need to be changed frequently, often after producing only a few parts of each kind.

In hot press forming, the prepreg is laid-up, bagged (if necessary), and placed between matched metal tools that include forming surfaces that define the internal, external, or both mold lines of the completed part. The tools and composite preform are placed within a press and then the tools, press, and preform are heated. By "preform" we mean the prepreg lay-up.

The tooling in autoclave or hot press fabrication is a significant heat sink that consumes substantial energy. Furthermore, the tooling takes significant time to heat the composite material to its consolidation temperature and, after curing the composite, to cool to a temperature at which it is safe to remove the finished composite part.

As described in U.S. Pat. No. 4,657,717 a flat composite prepreg panel was sandwiched between two metal sheets made from a superplastically formable alloy, and was formed against a die having a surface precisely contoured to the final shape of the part.

Attempts have been made to reduce composite fabrication times by actively cooling the tools after forming the composite part. These attempts have shortened the time necessary to produce a composite part, but the cycle time for and cost of heating and cooling remain significant contributors to overall fabrication costs. Designing and making tools to permit their active cooling increases their cost.

Boeing described a process for organic matrix forming and consolidation using induction heating in U.S. patent application Ser. No. 08/169,655. There, prepregs were laid up in a flat sheet and were sandwiched between aluminum susceptor facesheets. The facesheets were susceptible to heating by induction and formed a retort to enclose the prepreg preform. To ensure an inert atmosphere around the composite during curing and to permit withdrawing volatiles and outgassing from around the composite during the consolidation, we welded the facesheets around their periphery. Such welding unduly impacts the preparation time and the cost for part fabrication. It also ruined the facesheets (i.e., prohibited their reuse which added a significant cost penalty to each part fabricated with this approach). Boeing also described in U.S. patent application Ser. No. 08/341, 779 a technique that readily and reliably seals facesheets of the retort without the need for welding and permits reuse of the facesheets in certain circumstances. Our "bag-and-seal" technique applies to both resin composite and metal processing.

An example of a metal forming process combines brazing and superplastic forming of metal with a single induction heating cycle. In U.S. patent application Ser. No. 08/151, 433, Boeing describes using a metal pack or retort to contain the multiple sheets in the workpiece with susceptor facesheets that define a pressure zone for the workpiece where we can introduce an inert atmosphere. In the SPF/ brazing process, too, we welded the sheets of the retort along their periphery. The welds are costly to prepare, introduce trimming as a necessary step to recover the completed part, and limit the reuse of the retort sheets since they must be shaved smaller when trimming away the weld to recover the completed part. In U.S. patent application Ser. No. 08/341, 779, we described resealable bagging systems applicable to this metal forming operation as well.

Similarly in U.S. patent application Ser. No. 08/452,216, Boeing describes the generalized case for combined heat cycle processing as exemplified by the combined SPF/ brazing or a combined SPF/β-annealing cycles. Again, the workpiece in these processes is bagged within the external susceptor sheets. The facesheets heat when the induction coil induces eddy currents within them. The facesheets subsequently conduct or radiate their heat to the workpiece.

For purposes of this description, we use "consolidation" to mean both pressure compacting and/or curing of an organic matrix resin through thermally activated chemical reactions to produce a stable composite. By "forming," we mean shaping the composite or metal and retort in its plastic state. "Forming" may entail superplastic forming (SPF), drawing, or some other shaping operation, as those skilled in the art will understand.

The dies or tooling for induction processing are a cast ceramic because a ceramic is not susceptible to induction heating and, preferably, is a thermal insulator (i.e., a relatively poor conductor of heat). The cast ceramic tooling is strengthened and reinforced internally, with inexpensive, strong fiberglass rods or other appropriate reinforcements and externally with metal or other durable strongbacks to permit it to withstand the temperatures and pressures necessary to form, to consolidate, or otherwise to process the composite materials or metals. Ceramic tools cost less to fabricate than metal tools of comparable size and have less thermal mass than metal tooling. Because the ceramic tooling is not susceptible to induction heating, it is possible to embed induction heating elements in the ceramic tooling and to heat the composite or metal retort without significantly heating the tools. Thus, induction heating can reduce the time required and energy consumed to fabricate a part.

While graphite or boron fibers can be heated directly by induction, most organic matrix composites require a susceptor in or adjacent to the composite material preform to achieve the necessary heating for consolidation or forming. A retort of sealed susceptor sheets is also desirable for metal workpieces to control the atmosphere around the workpiece and to achieve uniform heating. The susceptor is heated inductively and transfers its heat principally through conduction to the preform or workpiece that is sealed within the susceptor retort. While the metals in the workpiece may themselves be susceptible to induction heating, the metal workpiece needs to be shielded in an inert atmosphere during high temperature processing to avoid oxidation of the metal, so we usually enclose the workpiece (one or more metal sheets) in a metal retort when using our ceramic tooling induction heating press. Enclosed in the metal retort, the workpiece does not experience the oscillating magnetic field which instead is absorbed in the retort sheets. Heating is by conduction from the retort to the workpiece.

Induction focuses heating on the retort (and workpiece) and eliminates wasteful, inefficient heat sinks. Because the ceramic tools in our induction heating workcell do not heat to as high a temperature as the metal tooling of conventional, prior art presses, problems caused by different coefficients of thermal expansion between the tools and the workpiece are reduced. Furthermore, we are energy efficient because significantly higher percentages of our input energy goes to heating the workpiece than occurs with conventional presses. Our reduced thermal mass and ability to focus the heating energy permits us to change the operating temperature rapidly which improves the products we produce. Finally, our shop environment is not heated as significantly from the radiation of the large thermal mass of a conventional press.

In induction heating for consolidating and/or forming organic matrix composite materials, we place a thermoplastic organic matrix composite preform of PEEK or ULTEM, for example, adjacent a metal susceptor. These thermoplastics have a low concentration of volatile solvents and are easy to use. The susceptor facesheets of the retort are inductively heated to heat the preform. We apply consolidation and forming pressure to consolidate and, if applicable, to form the preform at its curing temperature. Generally, we enclose the preform between two susceptor sheets that are sealed to form a pressure zone. We evacuate the pressure zone in the retort that surrounds the part in a manner analogous to conventional vacuum bag processes for resin consolidation. The retort is placed in an induction heating press on the forming surfaces of dies having the desired shape of the molded composite part. After the retort (and preform) are inductively heated to the desired elevated temperature, we apply differential pressure (while maintaining the vacuum in the pressure zone around the preform) across the retort which, in this case, functions as a diaphragm in the press to form the preform against the die into the desired shape of the completed composite panel.

The retort often includes three metal sheets sealed around their periphery to define two pressure zones. The first pressure zone surrounds the composite panel/preform or metal workpiece and is evacuated and maintained under vacuum. The second pressure zone is pressurized (i.e., flooded with gas) at the appropriate time to help form the composite panel or workpiece. The shared wall of the three layer sandwich that defines the two pressure zones acts as a diaphragm in this situation.

In preparing the retort, as described in U.S. patent application Ser. No. 08/341,779, we often use temporary seals to hold the sheets until the sheets are clamped into the press, and we prefer a "C" spring clamp. The clamp sandwiches the outer susceptor sheets of the retort and provides a compressive force to hold the retort together temporarily, pressing the sheets against an "O" ring gasket. Such a gasket seats between susceptor sheets in a machined groove or crimp around the periphery of adjacent susceptors. For processing below about 600° F. (315° C.), the gasket is generally silicone rubber. Between about 600° F. (315° C.) and 1300° F. (705° C.), the gasket is copper; above about 1300° F. (705° C.), the gasket is stainless steel. The gasket and susceptor sheets abut and form a gas seal via the compressive force of the die set. The "C" clamp permits handling of the retort in and out of the die set. The "C" clamp also provides a current path from the top sheet to the bottom sheet (when the gasket is rubber or stainless steel). The "C" clamp can be omitted when we use a copper gasket, but handling the susceptor sheets is more difficult. The "C" clamp jumper is only required for electrical continuity when the gasket is not an electrical conductor and, then, only on the edges of the retort transverse to the induction coils since the coils induce eddy currents in the susceptor that flow parallel to the coils.

We can perform a wide range of manufacturing operations in our induction heating press. These operations have optimum operating temperatures ranging from about 350° F. (175° C.) to about 1950° F. (1066° C.). For each operation, we usually need to hold the temperature relatively constant for several minutes to several hours while we complete the operations. While we can achieve temperature control by controlling the input power fed to the induction coil, we have discovered a better and simpler way that capitalizes on the Curie temperature of magnetic, electrically conductive materials. By judicious selection of the metal or alloy in the retort's susceptor facesheets and of the driving frequency, we can avoid excessive heating irrespective of the input power. With improved control and improved temperature uniformity in the workpiece, we produce better products.

SUMMARY OF THE INVENTION

We can perform a wide range of manufacturing operations in our induction heating workcell. These operations have optimum operating temperatures ranging from about 350° F. (175° C.) to about 1950° F. (1166° C.). For each operation, we usually need to hold the temperature relatively constant for several minutes to several hours while we complete the operation. While we can achieve temperature control by controlling the input power fed to the induction coil, we have discovered a better and simpler way that capitalizes on the Curie temperature. By judicious selection of the metal or alloy in the retort's susceptor facesheets, we can avoid excessive heating. With improved control and improved temperature uniformity in the workpiece, we produce better products. For example, steel undergoes a phase change at the Curie temperature (1414°–1454° F./768°–785° C.) from body centered cubic to face centered cubic. The new phase is nonmagnetic. Above its Curie temperature, the magnetic permeability of steel is unity. The point at which the permeability becomes unity is defined as the Curie temperature. When the susceptor becomes nonmagnetic, it becomes a much less efficient susceptor and the power input at the same field intensity drops dramatically. Therefore, the present invention is a method to capitalize on the Curie temperature phenomenon to control the absolute temperature of the workpiece and to obtain substantial thermal uniformity in the workpiece. Basically, the invention involves matching the Curie temperature of the susceptor to the desired temperature of the induction heating operation being performed.

BRIEF DESCRIPTION OF THE DRAWINGS

FIG. 7 is a table showing temperature variation in the part during its heating to the Curie temperature.

DETAILED DESCRIPTION OF THE PREFERRED EMBODIMENT

1. The Induction Heating Press

Figure 1:
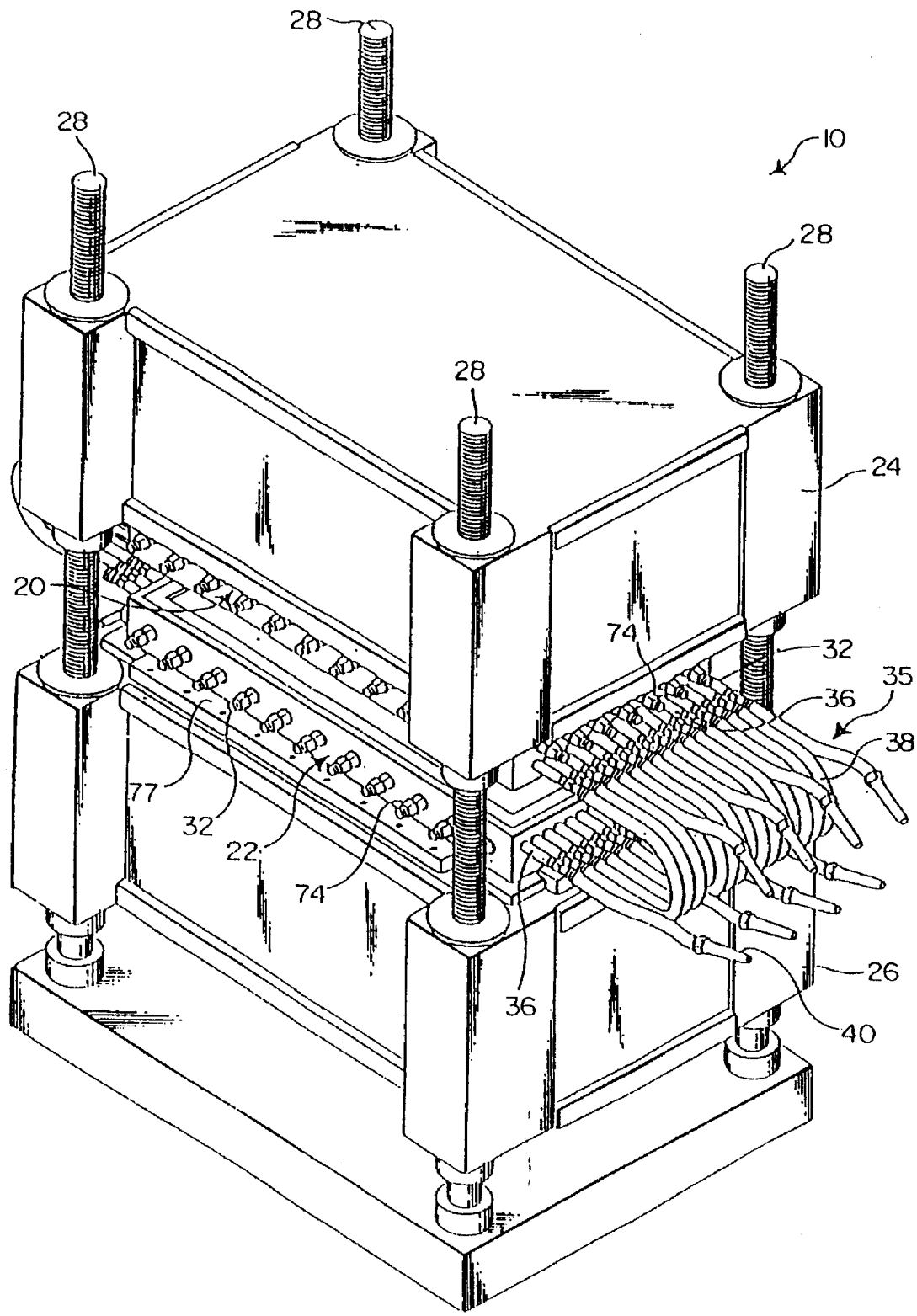
FIG. 1 is a perspective view of our induction heating workcell.

In FIG. 1, an induction heating workcell 10 includes tools or dies 20 and 22 mounted within an upper 24 and a lower 26 strongback. The strongbacks are each threaded onto four threaded column supports or jackscrews 28 or they float free on the columns and are fixed with nuts. We can turn the jackscrews to move one strongback relative to the other. The strongbacks 24 and 26 provide a rigid, flat backing surface for the upper and lower dies 20 and 22 to prevent the dies from bending and cracking during manufacturing operations. Preferably, the strongbacks hold the dies to a surface tolerance of ±0.003 inches per square foot of the forming surface. Such tolerances are desirable to achieve proper part tolerances. The strongbacks may be steel, aluminum, or any other material capable of handling the loads present during forming or consolidation, but we prefer materials that are nonmagnetic to avoid any distortion to the magnetic field that our induction coils produce. In some circumstances, the dies may be strong enough themselves that strongbacks are unnecessary. The strongbacks transfer pressure input through the columns evenly to the dies.

The dies 20 and 22 are usually ceramic and are reinforced with a plurality of fiberglass rods 32 that are held with bolts 74 and that extend both longitudinally and transversely in a grid through each die. Each die usually is framed with phenolic reinforcement 72 as well, to maintain a compressive load on the die. Each die may be attached to its strongback by any suitable fastening device such as bolting or clamping. In the preferred embodiment, both dies are mounted on support plates 76 which are held in place on the respective strongbacks through the use of clamping bars 77. The clamping bars 77 extend around the periphery of the support plates 76 and are bolted to the respective strongbacks through the use of fasteners (not shown).

The dies should not be susceptible to inductive heating so that heating is localized in the retort rather than distributed in the press as well. We prefer a ceramic that has a low coefficient of thermal expansion, good thermal shock resistance, and relatively high compression strength, such as a castable fused silica ceramic.

We embed portions of an induction coil 35 in the dies. In the illustrated embodiment, we use four separate induction segments, but the number can vary. Each segment is formed from a straight tubing section 36 that extends along the length of each die and a flexible coil connector 38 that joins the straight tubing sections 36 in the upper die 20 to the corresponding straight tubing section in the lower die 22. Connectors 40 located at the ends of the induction coil 35 connect the induction coil 35 to an external power source or coil driver 50 and to a coolant source.

Cavities 42 and 44 in the respective dies hold tool inserts 46 and 48. The upper tool insert 46 in some applications has a contoured forming surface 58 that has a shape corresponding to the desired shape of the outer mold line surface of the completed composite. The lower tool insert determines the inner mold line. The tool inserts also should not be susceptible to inductive heating, preferably being formed of a castable ceramic. In some cases, both the dies and the tool inserts can be made from a matrix resin rather than from a ceramic. Using a resin, however, limits use of the tooling to low temperature operations, such as forming or consolidating certain organic matrix composites. We prefer ceramic tooling which provides the greatest flexibility and versatility for the induction heating workcell. The forming surfaces can be an integral part of the dies.

Each die surrounds and supports the respective tool insert and holds the straight sections 36 of the induction coil in proper position in relationship to the tool insert 46 or 48. In the preferred embodiment, the interior 70 of the dies is formed of a castable phenolic or ceramic and the exterior sides from precast composite phenolic resin blocks 72. In some applications, we prefer to reinforce the phenolic or ceramic with chopped fibers or nonwoven or woven reinforcing mats.

Figure 2:
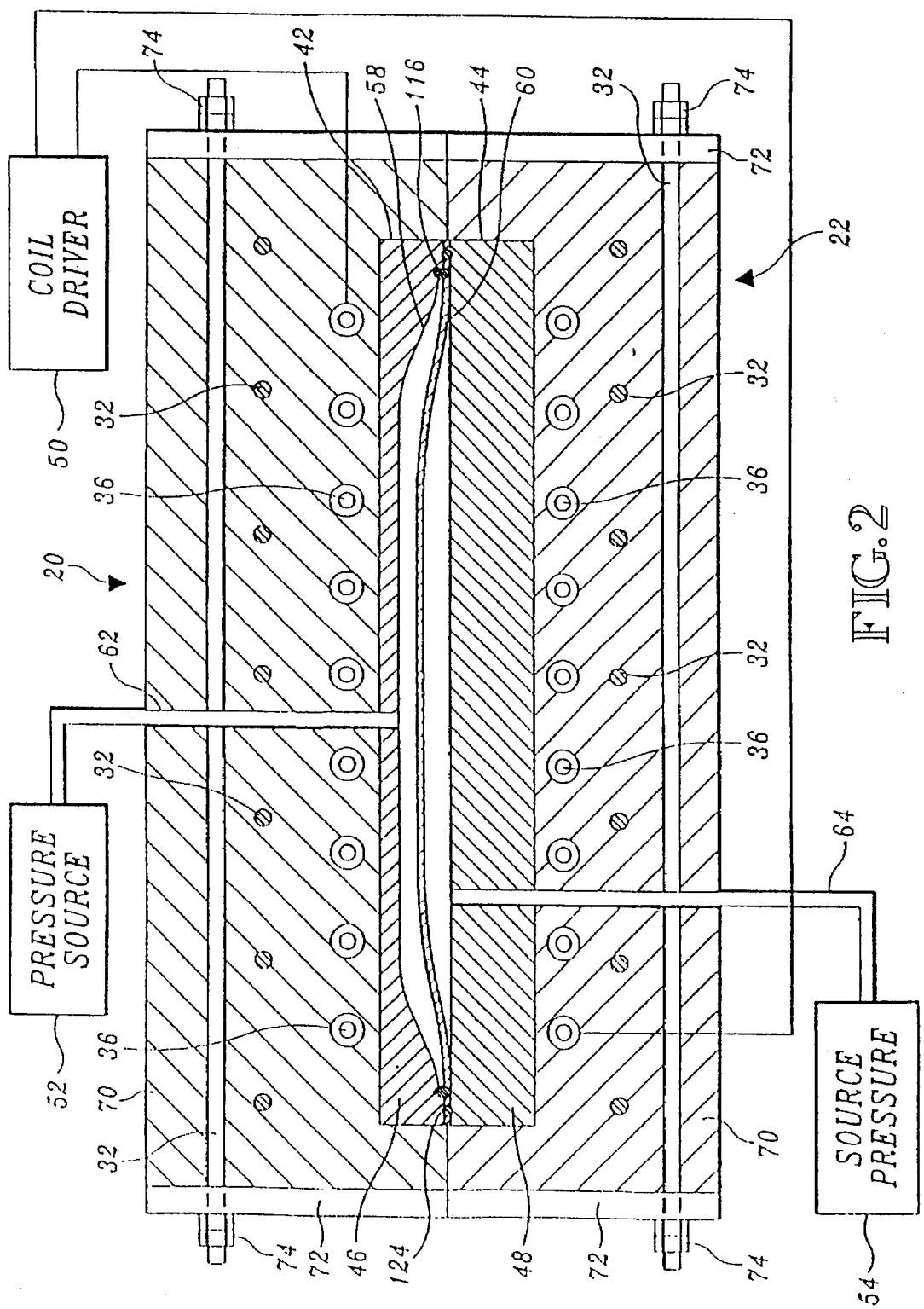
FIG. 2 is a schematic cross-sectional view of the apparatus of FIG. 1.

FIG. 2 shows a retort 60 between the tool inserts 46 and 48. The retort 60 includes an organic matrix composite panel or metal workpiece and sandwiching susceptor facesheets. The retort is heated to a forming or consolidation temperature by energizing the coil 35. In the case of a composite panel, when the panel reaches the consolidation temperature at which the matrix resin flows, we apply gas pressure to the outer surfaces of the retort by pressure sources 52 and 54. Pressure source 52 applies pressure to the upper surface of the retort 60 through a conduit 62 that passes through the upper die 20 and upper tool insert 46, while pressure source 54 applies a pressure to the lower surface of the retort 60 through a conduit 64 that passes through the lower die 22 and lower tool insert 48. The pressure applied to the retort 60 is maintained until the retort has formed to the contour of the forming surface 58 and the matrix resin has consolidated. The pressure sources 52 and 54 generally apply a differential pressure to the retort 60.

Pin holes (not shown) in the tool inserts vent gas trapped between the retort 60 and the forming surface 58 as the retort deforms. Such pin holes can be coupled to a flow meter to monitor the progress of the deformation.

When the forming and consolidation is complete, the induction coil 35 is de-energized, and the pressure relieved. The tool inserts and dies are separated. We remove the formed retort 60 from the press and recover the composite part from between the susceptor facesheets.

An alternating oscillating electrical current in the induction coil 35 produces a time varying magnetic field that heats the susceptor sheets of the retort via eddy current heating. The frequency at which the coil driver 50 drives the coils 35 depends upon the nature of the retort 60. We power the coil with up to about 400 kW at frequencies of between about 3–10 kHz. Current penetration of copper at 3 kHz is approximately 0.06 inches (1.5 mm), while penetration at 10 kHz is approximately 0.03 inches (0.75 mm).

The shape of the coil has a significant effect upon the magnetic field uniformity. Field uniformity usually is important because temperature uniformity induced in the retort is directly related to the uniformity of the magnetic field. Uniform heating insures that different portions of the workpiece will reach the operating temperature at approximately the same time. Solenoid type induction coils like those we illustrate provide a uniform magnetic field, and are preferred. Greater field uniformity is produced in a retort that is located symmetrically along the centerline of the surrounding coil. Those of ordinary skill can establish series/parallel induction coil combinations, variable turn spacing, and distances between the part and the induction coil by standard electrical calculations to achieve the desired heating from whatever coil configuration is used.

The tool inserts and dies are usually substantially thermally insulating and trap and contain heat within the retort. Since the dies and tool inserts are not inductively heated and act as insulators to maintain heat within the retort, the present invention requires far less energy to achieve the desired operating temperature than conventional autoclave or resistive hot press methods where the metal tooling is a massive heat sink.

The operations using our workcell are faster than prior art operations because we do not heat the large thermal mass of either the dies or tool inserts prior to the induction heating process. The retort is heated, the tool is not. Thus, the necessary processing temperature is achieved more rapidly. In addition, the highly conductive materials in the retort provide rapid heat transfer to the workpiece. When the driver 50 is de-energized, the dies and the retort cool rapidly to a temperature at which we can remove the retort from the workcell, saving time and energy over conventional systems. Coolant flowing through the coil tubes functions as an active heat exchanger to transfer heat out of the workpiece, retort, and dies. In addition, the thermal cycle is not as limited by the heating and cooling cycle of the equipment and tools so we can tailor the thermocycle better to the process for which we are using the induction heating workcell.

2. A Typical Manufacturing Operation

Figure 3:
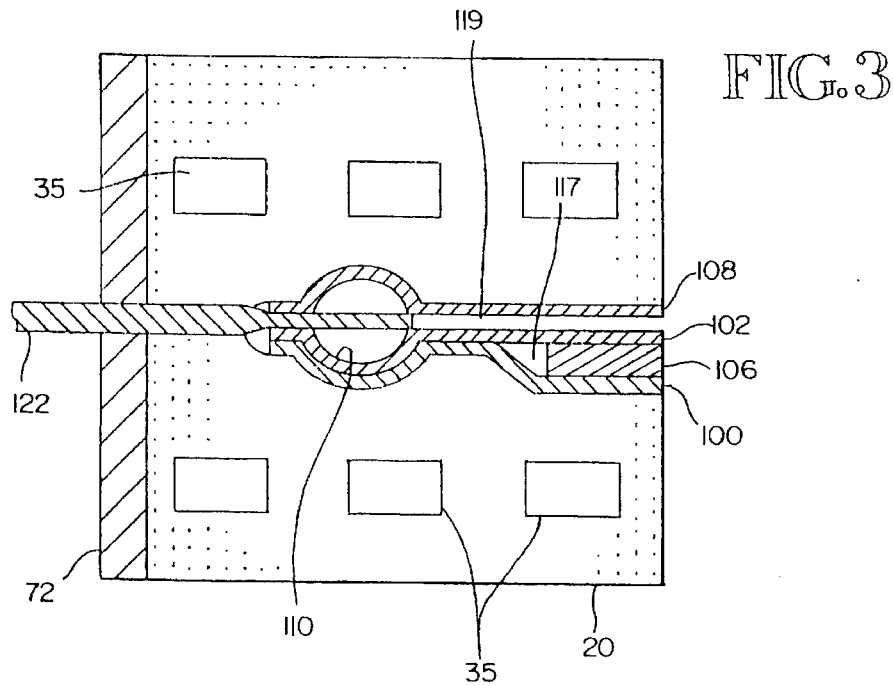
FIG. 3 is a schematic sectional view of our induction heating workcell showing the detail of the typical edge sealing for our resealable bag.

For example, in a forming or consolidating process for organic (resin) matrix composites, a composite panel is laid-up from individual layers of prepreg. The composite panel is placed between a first sheet 100 and second sheet 102 of a susceptor (usually aluminum or an aluminum alloy) to form a retort. As shown in FIG. 3, the susceptor sheets are sealed around their periphery with a crimp formed into the susceptor sheets. A first pressure zone 117 between the susceptors 100 and 102 surrounds the composite panel. A third sheet 108 of susceptor is positioned over the second sheet 102 and is edge sealed with another high temperature rubber gasket 110. Preferably, the gasket in this operation is silicone rubber and is sized to contain the prepreg 106 by abutting against it. The second and third sheets together define a second pressure zone 119 that can be pressurized with argon or another suitable inert gas during the forming and consolidating of the composite panel to provide an overpressure similar to the pressure common in conventional autoclave processing or a forming pressure, depending upon the part being made and the die configuration. A contact edge strip might be used as a compression edge seal and provides electrical continuity (i.e., acts as an electrical jumper) between the first and the third sheets 100 and 108 as well as pressing the sheets against the gasket. Additional compressive force is applied when the retort is clamped in the press. The first and second sheets abut in the vicinity of the gasket 110. Typically the contact edge strip is a copper, elongated "C" because it has good conductivity, ductility, and susceptibility, but we could substitute other metals.

In FIG. 3, which illustrates a consolidation operation as opposed to a forming operation, the first and third sheets 100 and 108 of susceptors contact the dies, without leaving additional pressure zones between the outer susceptors and the dies, as we described with reference to FIG. 2. When additional pressure zones are used, these zones receive pressurized forming gas through a system of conduits fabricated in the dies as described in U.S. Pat. Nos. 4,708,008; 5,129,249; or 5,309,747 or in U.S. patent application Ser. No. 08/138,282, which we incorporate by reference. When a third sheet 108 of susceptor is used, the retort incorporates the necessary pressure zones so that the dies can be porous. Such dies do not need to carry or contain high pressure gases. They are lighter, are easier to make, and are less expensive. Therefore, we prefer a system like that illustrated in FIG. 3.

Forming gas to the pressure zone between the second and third sheet of the susceptors is introduced through suitable pressure lines 122 that penetrate the edge strip gasket 110 at desired locations, to deliver pressurized inert gas to the second pressure zone 119. These pressure lines 122 correspond to those used with the edge welded retorts we described in U.S. patent application Ser. No. 08/169,655. Similar lines can also be used to allow fluid communication with the pressure zone 117 between the first and second sheet of the susceptor where the composite panel prepreg is placed. If such lines are used, they generally are used to evacuate the first pressure zone 117.

After placing the retort between the upper and lower tool inserts and bringing the tool inserts together, we evacuate the pressure zone surrounding the composite panel. Pulling a vacuum around the composite panel helps to reduce voids in the completed composite part because we draw off any residual volatiles (i.e., solvent) in the prepreg and reaction products (especially water) generated during curing of the organic matrix resin. We can form void-free parts, comparable to autoclave parts. We achieve energy savings and time savings. Evacuating the pressure zone and continuing suction around the panel also helps to ensure that the first sheet and second sheet seat tightly against the composite panel during consolidation and forming which in turn helps to prevent wrinkles and flaws in the surfaces of the completed part. Precision forming of the inner or outer mold lines, or both, is readily achieved.

While evacuating the zone around the panel, we energize the coil driver to power the coil 35 with an alternating current to produce a time varying magnetic field to heat the susceptors inductively to the forming and consolidation temperature of the composite panel. Heat is transferred by conduction and/or radiation from the susceptors into the composite panel, so it, too, reaches the consolidation temperature.

Gas is supplied to the second pressure zone between sheets 102 and 108 to force the diaphragm susceptor sheet 102 against the composite panel to achieve the desired shaping of the composite panel in accordance with the shaping of the respective die insert configuration. The pressure within the pressure zone is maintained until the composite panel has fully formed and consolidated.

Pressurizing the second pressure zone 119 places a force on the retort which helps to consolidate the composite panel and regulates the rate at which the entire workpiece deforms. We reduce the pressure in the first pressure zone 117 around the panel slightly below the pressure in the second pressure zone 119 and generally draw a vacuum to decrease the pressure in the first pressure zone thereafter to provide a differential pressure adequate to deform the composite panel and the first susceptor sheet 100 and second, diaphragm susceptor sheet 102 into contact with the forming surface 58. Of course, we could use backpressure in zone 119 or a combination to achieve the differential forming pressure. Generally we need a combination.

After completing consolidation, we shut off the induction coil and cool the formed retort and tool inserts to a temperature below the forming temperature at which we remove the formed retort from the tool inserts. Although there is some heat transfer between the retort and the tool inserts, it is insufficient to heat the tool inserts or dies substantially because the dies are such good thermal insulators and are water cooled. Therefore, the retort can quickly be pulled from the press. When the retort cools sufficiently, we remove the edge strips recover the completed part. Often the edge strips and the susceptor sheets are reusable.

In one example of composite consolidation and forming in accordance with the present invention, we consolidated and formed a composite panel comprising 48 layers of thermoplastic PEEK.IM6 prepreg ⅜ inch thick. Three aluminum sheets having a thickness of 1/16 inch were placed around the composite panel and the resulting retort was placed in the tool inserts and inductively heated in five minutes to a temperature of 720° F. (382° C.) by induction heating. We maintained the retort at 720° F. (382° C.) for two minutes and then cooled it for twenty minutes. We pressurized the second pressure zone to approximately 250 psi while we vented the first pressure zone 117 around the panel to atmospheric pressure. We maintained the pressure in the second pressure zone 119 for 22 minutes to consolidate the composite panel and to compress it during the cure. These times and pressures are representative only and would differ depending upon the composite material used and the thickness and complexity of the formed part.

Depending upon the application, it may be advantageous to maintain different pressures in different cells of the pressure zone at different locations of the composite part. Welding the second and third sheet along one or more weld lines internal of the periphery defines separate pressure cells between these sheets that may be individually pressurized at different pressures. Of course, such welding destroys the reuse potential for these sheets.

The present invention is applicable to all types of organic matrix composites including both thermosetting and the thermoplastic composites such as epoxies, bismaleimides, polyimides, PEEK, PEK, PEKK, PES, or the like. It is especially suited, however, for consolidation or forming of resins that have low volatiles content and that are nonreactive (i.e., the true thermoplastics like PEEK or ULTEM).

The surface of an aircraft wing skin must be maintained to a close tolerance to achieve an efficient aerodynamic surface. The tolerances of the inner mold line surface of the wing skin must also be maintained at a close tolerance at least in a buildup area where the wing skin will be joined to a spar to ensure that the wing skin and spar can be precisely joined. It is not critical, however, to control the inner mold line surface in areas where the wing skin is not attached to other structures. The composite panel has additional plies to define the buildup areas. The additional reinforce the composite panel in these areas which is necessary where a spar will be attached, and provide a convenient way to match the skin and spar to produce the desired outer wing configuration even if the spars are imprecise in their dimensions. We can fabricate built up areas at the faying surfaces to provide the precision fit, in which we can eliminate shims.

3. Metal Processing

For metal processing, such as brazing, SPF, or a combined brazing/SPF processing cycle, or the like, we can use copper susceptor sheets about 0.032–0.062 inches thick. The copper allows higher processing temperatures than aluminum or aluminum alloys, and it provides excellent heat transfer. Copper's excellent heat transfer properties help to ensure improved thermal uniformity. We typically use an inert atmosphere within the interior pressure zones to protect the susceptor and the parts being produced (i.e. the workpiece) against oxidation or other corrosion. That is, the inert gas purge protects the workpiece (and the copper retort materials) from oxygen damage.

The processing of metals with the reseatable bag retort is essentially the same as that described for the forming and consolidating of organic matrix composites, so we will not repeat it here. Suffice it to say that the metal workpiece (one or more sheets) is enclosed between the copper susceptor sheets to form a retort.

4. Temperature Control Capitalizing on the Susceptor's Curie Temperature

While in the past we used susceptors that were capable of heating up to and beyond the desired operating temperature, today we can judiciously select a susceptor so that we can control heating to the Curie temperature of the susceptor. By driving the susceptor to its Curie temperature, we achieve a guaranteed maximum temperature that is uniform throughout the susceptor. This uniform susceptor temperature translates to improved temperature uniformity in the workpiece. Furthermore, the Curie temperature phenomena permits us to hold the temperature substantially constant without expensive electrical controls.

At the Curie temperature of a magnetic material, the magnetic permeability of the material becomes unity and the material becomes nonmagnetic. In this state, the material is not as susceptible to induction heating because the time varying magnetic field will induce less concentrated currents throughout the depth of the material. Induction heating above the Curie temperature requires a substantial increase in input current over what is required for sustained operation at the Curie temperature. The nonmagnetic phase heats inefficiently.

Without the Curie temperature phenomenon, achieving temperature uniformity requires precise control of the input power to the coil, the coil configuration, and the input frequency. Even with precise control, local hot spots can develop because of spatial variations in the magnetic field strength. Part location within the coil must be accurately controlled and the precision and accuracy needed can make such control impractical. With "smart susceptors," the control is simple -Rx.

In a material, the magnetic field intensity at any depth is represented by the formula:

$$H_y = H_o(e^{-y/\delta})$$

when

H=the magnetic field intensity;
y=the depth from the surface;
$H_o$=the magnetic field intensity at the surface;
$\delta = (S/\pi\mu F)^{1/2}$ [i.e., the skin depth];
$\delta$=the resistivity of the material;
µ=the magnetic permeability of the material; and
F=the frequency.

the skin depth ($\delta$) is the depth at which the magnetic field intensity declines to 1/e (i.e., 37%) of the surface intensity. The magnetic field intensity, of course, influences the magnitude of heating at any depth into the material.

The total heat generation ratio between the magnetic and nonmagnetic states is given approximately by the equation:

$$\Theta_n/\Theta_m = (\mu_n)^{1/2}/(\mu_m)^{1/2}$$

wherein $\Theta$=the heat generation rate;
m=magnetic state;
n=nonmagnetic state; and
µ=the magnetic permeability.

Assuming a constant magnetic field intensity applied at the surface, and a total material thickness greater than the nonmagnetic skin depth.

The relative magnetic permeability of steel is about 180 at ambient temperature, and is 1 at the Curie temperature. As the steel heats and approaches its Curie temperature, the permeability falls off so that portions of the retort at or above the Curie temperature are heating at a significantly slower rate than portions of the retort that are cooler. Heat conduction and lower losses in the higher temperature regions quickly stabilize the temperature to the Curie temperature.

Figure 5:
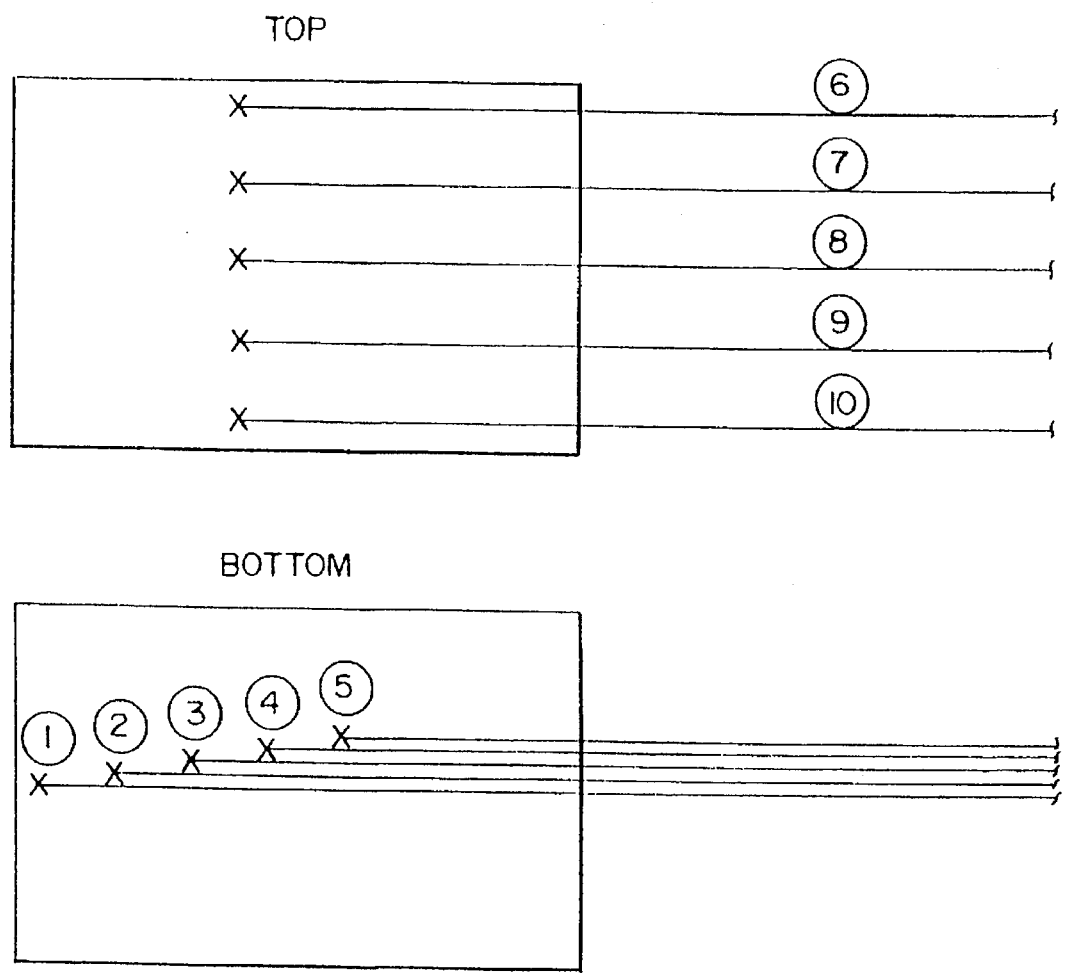
FIG. 5 is a schematic thermocouple layout diagram for brazing honeycomb to sheet skins with thermocouples 1–5 on the bottom and 6–10 on the top.

The following example illustrates the temperature uniformity we have been able to achieve in the inductive brazing of Inconel 625 honeycomb core to Inconel 625 facesheets. We measured the temperature at various locations in the layup using the thermocouple arrangement illustrated in FIG. 5. The distribution provided the longitudinal temperature pattern along inside surface of the bottom of the workpiece and the transverse temperature pattern along the top inside surface. The workpiece was about 35×36×0.5 in with facesheets approximately 0.012 in thick and a foil thickness of about 0.002 in for the honeycomb core. We enclosed the workpiece in a (low carbon) 1008 steel retort with the sheet thickness of the steel being about 0.072 in. We welded the retort to provide the seal and surrounded the workpiece within the retort with an inert gas purge.

Figure 4:
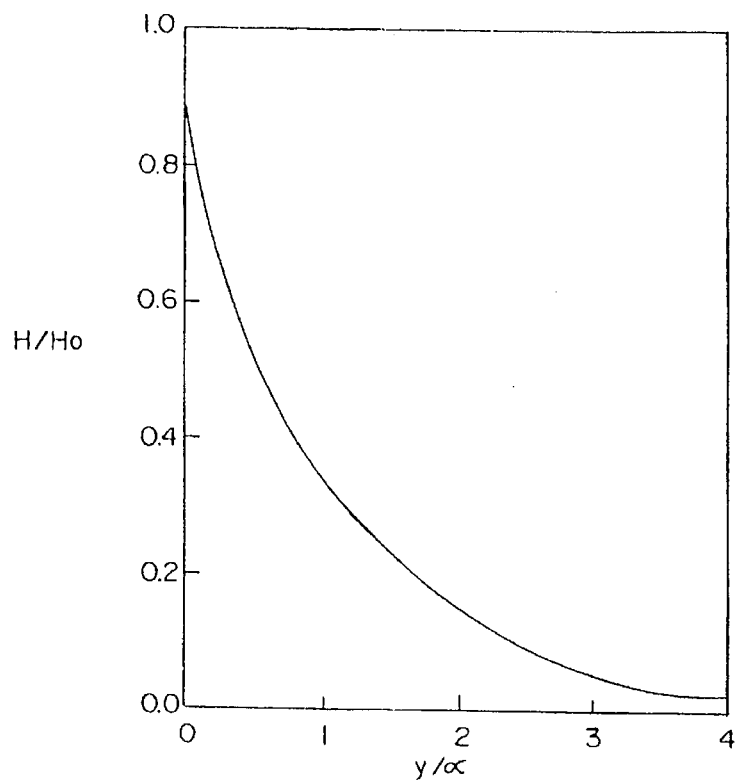
FIG. 4 is a graph illustrating the variation of magnetic field intensity with depth of penetration into the material.
Figure 6:
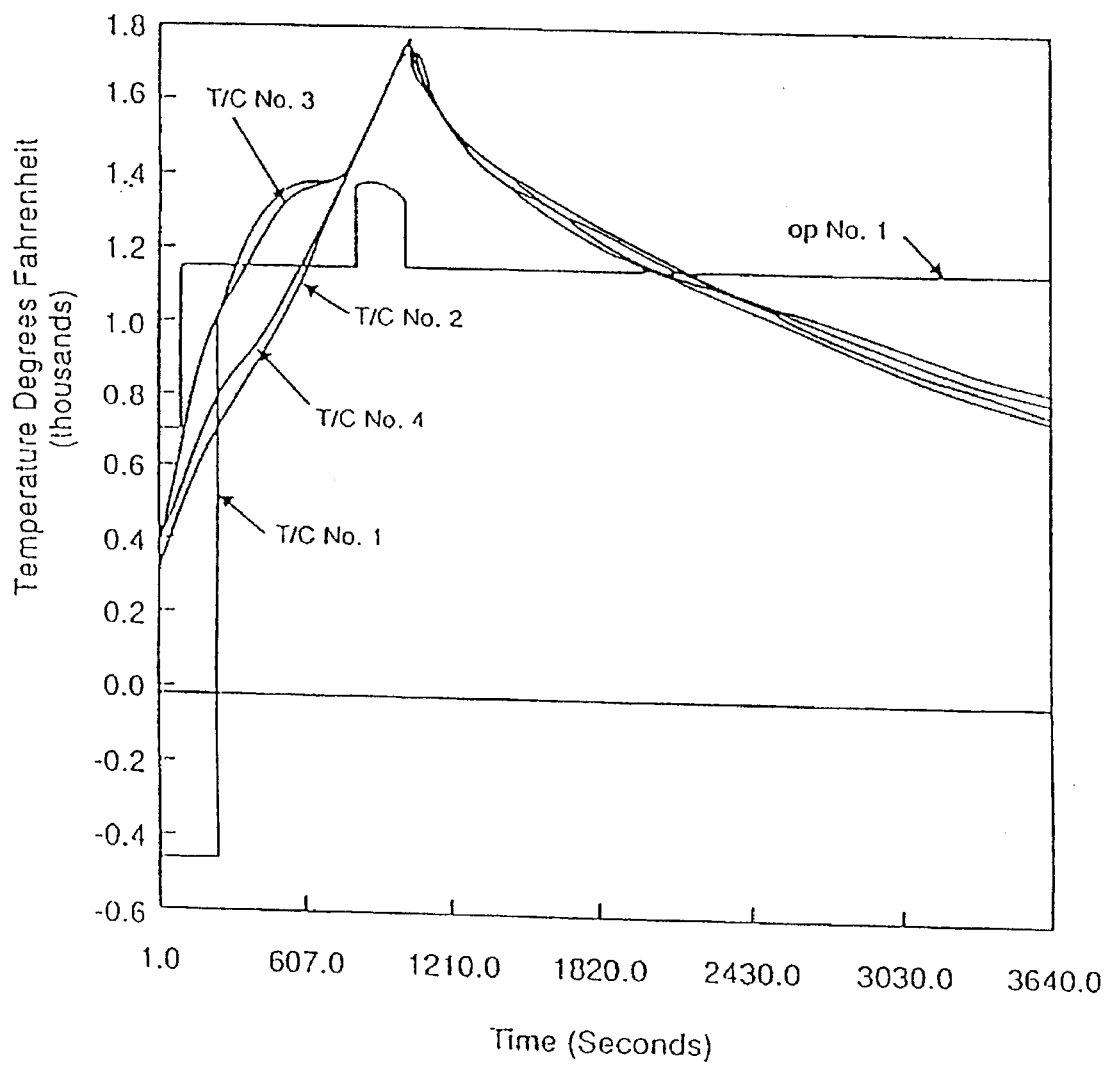
FIG. 6 is a thermal profile of several thermocouples illustrated in FIG. 5 during heating of the workpiece of FIG. 5 during brazing.

FIG. 6 shows the thermal profile measured for several of the thermocouples on the bottom of the workpiece. FIG. 4 presents the measured temperature at each of the identified thermocouples during the heating cycle. After about 500 seconds, the workpiece had significant temperature variation over the surface with some locations being at temperature as much as about 260° F. (150° C.) different. This temperature variation occurred even though we otherwise attempted to control the parameters (coil configuration, coil frequency, retort location, etc.) to achieve thermal uniformity.

FIG. 7 also shows that the temperature variation dissipated to a spread of no more than about 20° F. (11° C.) after about 700 seconds when the 1008 steel reached its Curie temperature. Then, the workpiece was substantially uniformly heated to a temperature in the range of about 1440°–1470° F. (782°–800° C.) with a relatively uniform rate of increase over the entire surface. We received similar results with the temperatures measured at the other thermocouples. We attribute the temperature leveling to result from the increase in current penetration and resulting decrease in the current density in the susceptor because of the decrease in magnetic permeability as we approached the Curie temperature of the 1008 steel.

Figure 8:
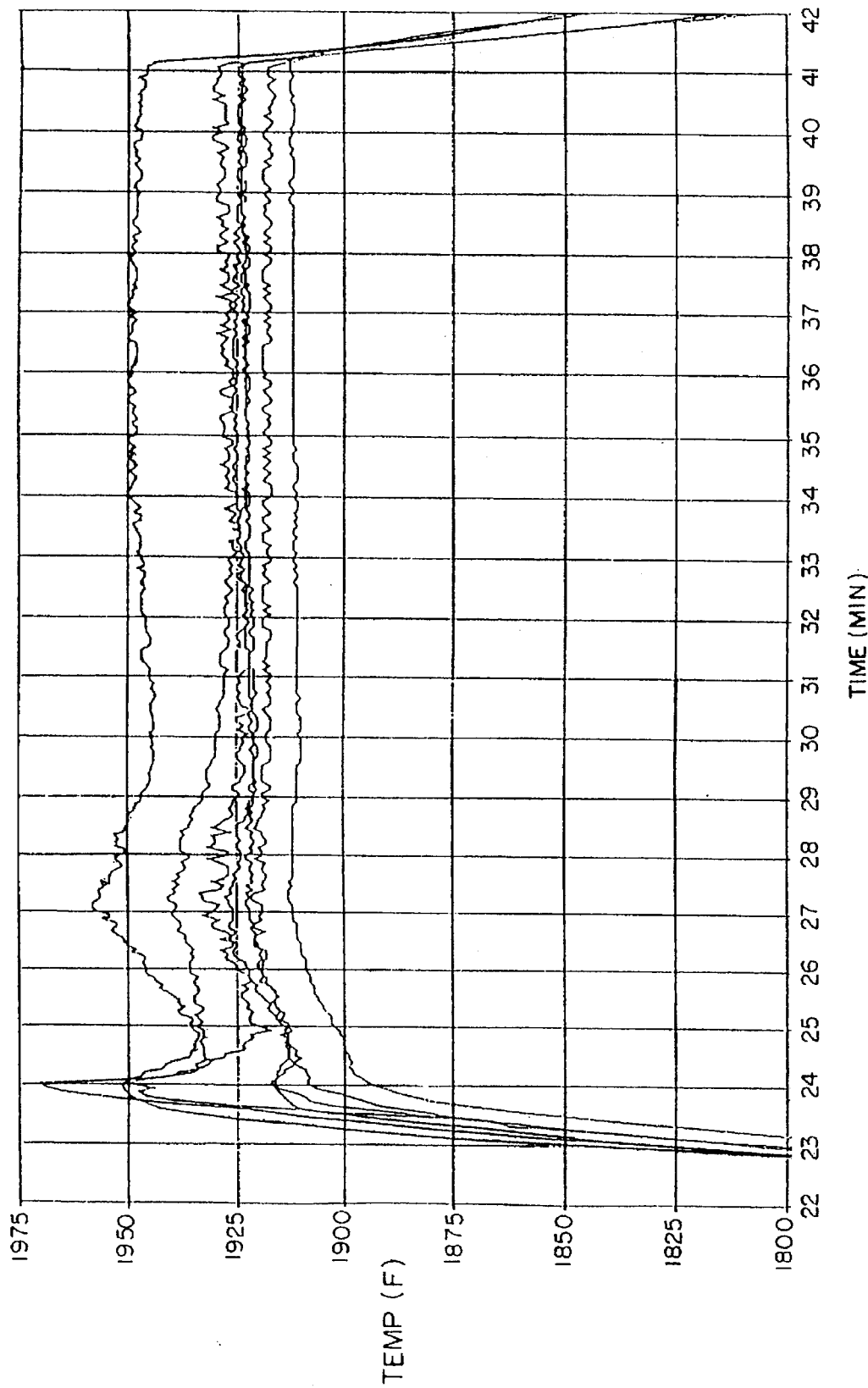
FIG. 8 is a thermal profile illustrating temperature uniformity for about 18 min at 1930° F. (1055° C.) for β-annealing of Ti-6Al-4V alloy.
Figure 9:
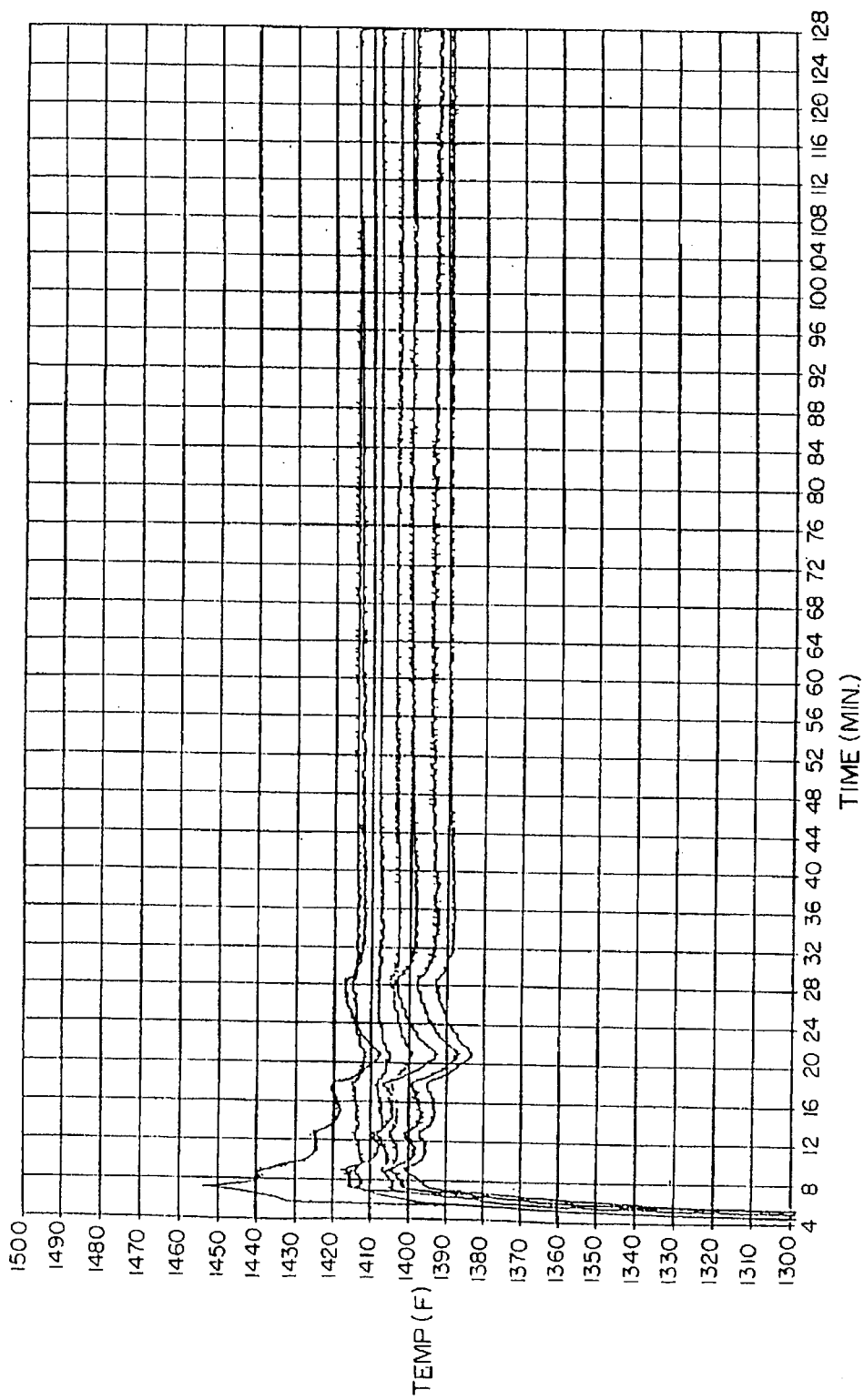
FIG. 9 is a thermal profile illustrating temperature uniformity for about 100 minutes at 1400° F. (760° C.) for the stabilization anneal of Ti-6Al-4V alloy.
Figure 10:
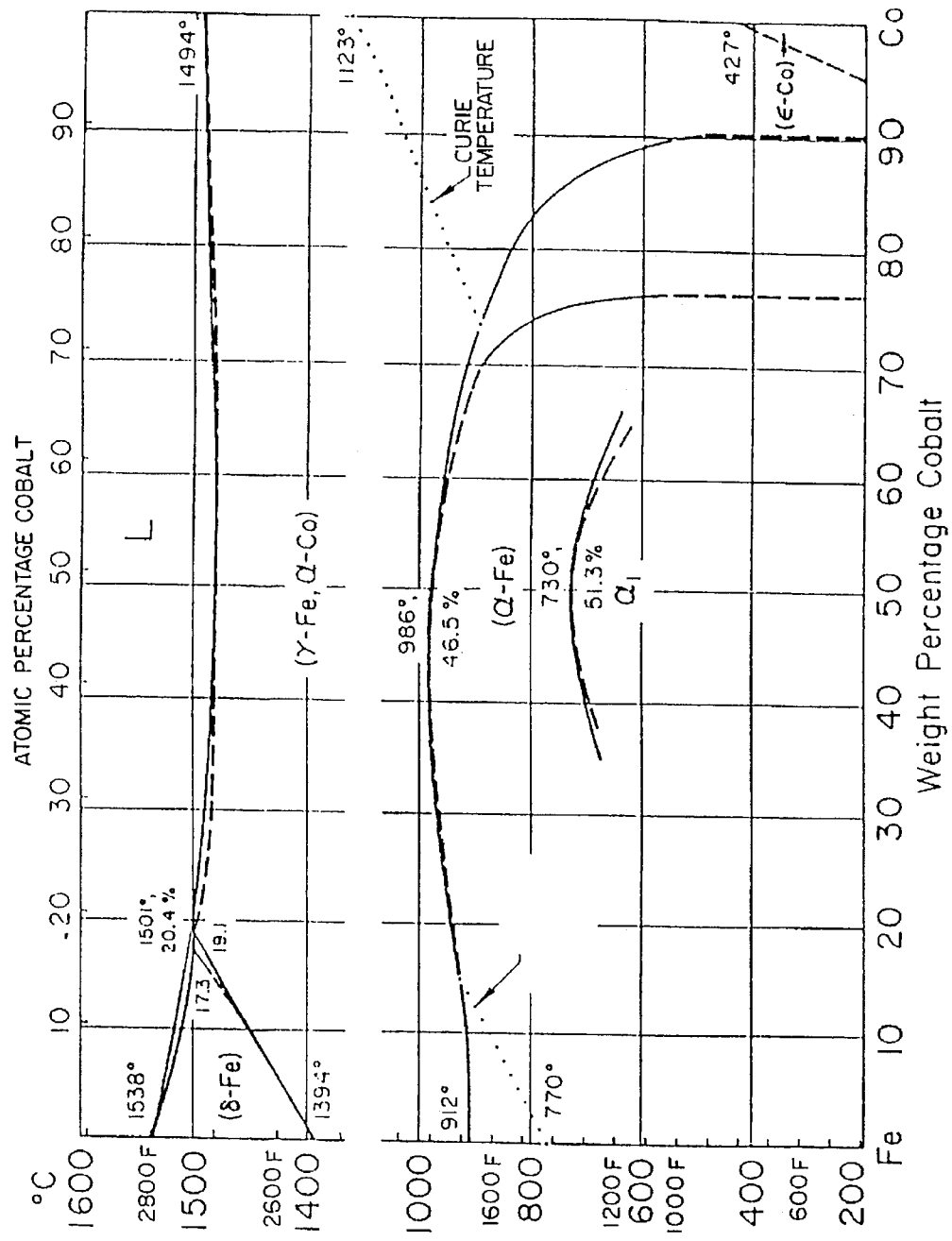
FIG. 10 shows a phase diagram for cobalt-iron alloys and their Curie temperatures.
Figure 11:
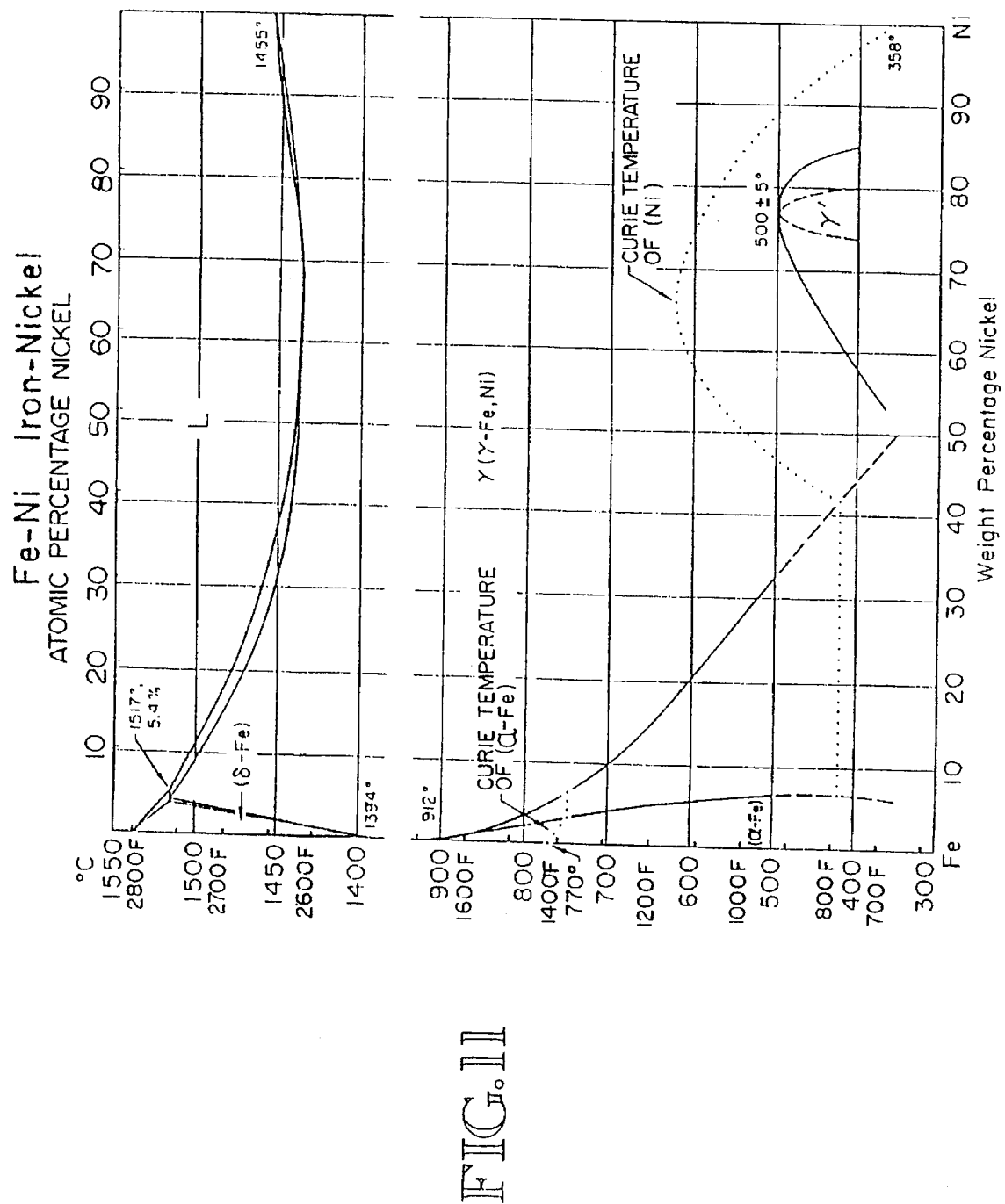
FIG. 11 shows a phase diagram for nickel-iron alloys and their Curie temperatures.

FIGS. 8 and 9 illustrate our ability to achieve substantial temperature uniformity in the workpiece for the extended times necessary for the β-anneal or stabilization anneal of Ti—6A1—4V alloy. In FIG. 8 where we achieved a temperature of about 1930°±15° F., we used ductile cobalt (5% Fe—95% Co) as the susceptor. The retort sheets were about 0.040 in thick and we conducted the heating at 3 kHz. In FIG. 9, we achieved a temperature of about 1400° F. using 0.028 in thick 1008 steel at a frequency of coil current of 3 kHz.

Judicious selection of the alloy permits us to achieve temperature leveling over a wide range. The choice of the susceptor material depends upon the manufacturing operation's operating temperature. The alloys of general interest are cobalt/iron, nickel/iron, iron/silicon, or amorphous or crystalline magnetic alloys. Cobalt-iron alloys have Curie temperatures in the range of about 1420°–2050° F. (770°–1120° C.). Nickel-iron alloys have Curie temperatures in the range of about 675°–1150° F. (355°–620° C.). The crystalline and amorphous alloys have a wide range of possibilities as illustrated in the following table:

TABLE 1

CRYSTALLINE ALLOYS

| Composition | Curie Temperature | Trade Names |
| --- | --- | --- |
| 35Co—Fe | 980° C. (1796° F.) | Hiperco 35 |
| 49Co-49Fe-2V | 960° C. (1760° F.) | Supermendur, Hiperco 50 |
| 27Co—Fe | 940° C. (1724° F.) | Hiperco 27 |
| 3Si—Fe, Non-Grain Oriented | 740° C. (1364° F.) | AISI M-14, M-15, etc. |
| 3Si—Fe, Singly Grain Oriented | 740° C. (1364° F.) | Silectron, Magnesil, Microsil |
| 3Se—Fe, Doubly Grain Oriented | 740° C. (1364° F.) | Cubex |
| 50Ni-50Fe, Square Loop | 520° C. (968° F.) | Deltamax, Orthonol, Square Mu 49 |
| 50Ni-50Fe, Round Loop | 520° C. (968° F.) | 4750, 48 Alloy, Centrimu 10 |
| 79Ni-17Fe-4Mo, Square Loop | 400° C. (752° F.) | Square Permalloy, Square Permalloy 80, Square Mu 79 |
| 79Ni-17Fe-4Mo, Round Loop | 400° C. (752° F.) | 4-79 Mo-Permalloy, Round Mu 80, Centrimu 20 |
| 80Ni-15Fe-5Mo | 400° C. (752° F.) | Supermalloy |

AMORPHOUS MATERIALS

| Composition | Curie Temperature | Trade Names |
| --- | --- | --- |
| $Fe_{81}B_{13.5}Si_{3.5}C_2$ | 370° C. (698° F.) | Metglas 2605SC |
| $Fe_{77}B_{16}Cr_2Si_5$ | 358° C. (676° F.) | Metglas 2605S-3A |
| $Co_{66}Fe_4Ni_1Si_1B_{14}$ | 205° C. (401° F.) | Metglas 2714A |

Table 2 lists several induction heating operations and the preferred susceptor material we suggest to achieve temperature leveling near the Curie temperature.

TABLE 2

| Process | Preferred Susceptor | Curie Temperature |
| --- | --- | --- |
| β-annealing of Std. grade Ti-6Al-4V | ductile cobalt (5% Fe-95% Co) | 1950° F. |
| Stabilization anneal of titanium alloys | 1008 Steel | 1414° F. |
| β-annealing of ELI Ti-6Al-4V | 88% Co-12% Fe | 1850° F. |
| 3003 aluminum brazing alloy with titanium core | (3–4% silicon)-(96–97% Fe) | 1360° F. |
| 95% Ag-5% Al brazing alloy with titanium core | 49% Co-49% Fe-2%V | 1760° F. |
| SPF of Ti-6Al-4V | (85–86% Fe)-(14–15% Co) | 1650° F. |
| Ag brazing of titanium | 35% Co-65% Fe | 1796° F. |
| Consolidation/Forming of PEEK | 79% Ni-17% Fe-4% Mo | 752° F. |
| Consolidation/Forming of ULTEM | 97% Ni-3% Fe | 685° F. |
| Welding ULTEM or PEEK | 79% Ni-17% Fe-4% Mo or 42% Ni-58% Fe (Invar 42) | 752° F. 680° F. |
| Welding thermoset assemblies | Amorphous $Co_{66}Fe_4Ni_1Si_{15}B_{14}$ | 401° F. |

Of course there are other Co—Fe—Ni alloys that might also be used or other alloys of Co, Fe, or Ni, as those of ordinary skill in the art will understand.

5. Multilayer Susceptors

We can achieve thermal control at different set points (operating temperatures) for combined cycle operations, like SPF/brazing or SPF/annealing that we describe in copending U.S. patent application Ser. Nos. 08/406,349 and 08/151,433 that we incorporate by reference. To achieve such control, we use multilayer susceptors with alloys tuned in Curie temperature to the various operating temperatures. Between the tuned layers, we can use a thin, highly conductive, nonmagnetic layer such as copper or aluminum to provide a low resistance electrical path for the induced current when the overlying layer is nonmagnetic. If used, this conductive layer must be thin enough for the magnetic flux to penetrate to the underlying layer. One example of a multilayer susceptor would combine 0.028 in HyMu80 (Curie temperature 752° F.) with 0.028 in Hiperco 50 (Curie temperature 1760° F.) optionally separated by about a 0.010 in copper film. The Hiperco 50 might be clad to a 0.032 in copper sheet as well.

Figure 12:
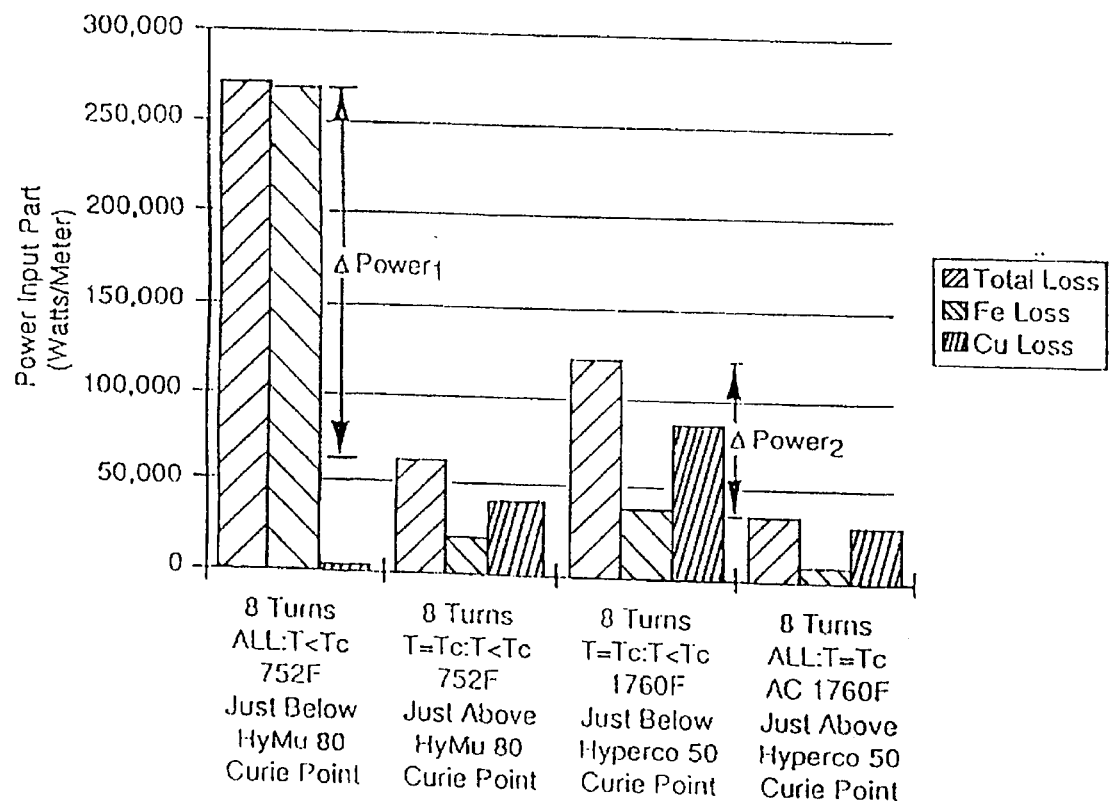
FIG. 12 is a representation of the power absorbed in a multilayer susceptor at various operating temperatures.

FIG. 12 shows the power drop we expect to experience with the 4-layer susceptor as a function of temperature. The power drop at either Curie temperature decouples the magnetic energy from conversion to heat to achieve the desired leveling in workpiece temperature.

While the invention has been described for operations in which the susceptor is used as the outer facesheets of a sealed retort, the Curie temperature phenomenon can also be used to advantage in any other induction heating operation, such as the thermoplastic welding operations Boeing described in U.S. Pat. No. 5,313,037 and Boeing's copending U.S. patent application Ser. Nos. 08/286,360; 08/344,027; 08/349,647; 08/352,991; 08/367,546; 08/367,969; and 08/367,545, which we incorporate by reference. In thermoplastic welding, we use a moving coil to induce eddy currents in a susceptor that is positioned along a bondline between two or more prefabricated, thermoplastic composite parts, especially a wingskin and a spar. We heat the susceptor to melt the organic matrix resin to create the weld. In this operation, the integrity of the weld is critical to the performance of the completed, welded structure. The quality of the weld is related to the temperature along the bondline and good welds require control of the temperature within a relatively narrow range during the welding. We particularly want to avoid overheating, so a "smart" susceptor made from a Co, Ni, or Fe alloy with a Curie temperature slightly above the melting temperature of the resin will help ensure that we produce quality welds. Furthermore, an alloy like Invar 42 (42% Ni—58% Fe) has a coefficient of thermal expansion (CTE) comparable to the resin so that embedding the susceptor into the completed part will not have as dramatic an impact if the susceptor is such an alloy rather than copper or another metal where the CTE mismatch between the resin and susceptor is larger.

In the thermoplastic welding, the susceptor may be in sheet, mesh, expanded, milled, selvaged or other suitable form and should be structured from the optimum conductivity longitudinally and transversely needed to obtain controlled, reliable, and reproducible heating. Geometry and structure are closely related to the type of induction head used.

While we have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples are given to illustrate the invention and not intended to limit it. Accordingly, limit the claims only as necessary in view of the pertinent prior art.

We claim:

1. A retort for induction processing of a workpiece, comprising:

(a) at least two metal sheets surrounding the workpiece; and (b) means for temporarily sealing the metal sheets around the workpiece, wherein the metal sheets are susceptible to heating by induction and have a Curie temperature so that the sheet becomes nonmagnetic and thereby has a lower susceptability to induction at a temperature greater than or equal to the Curie temperature.

* * * * *